United States Patent [19]

Batey et al.

[11] Patent Number: 4,467,374

[45] Date of Patent: Aug. 21, 1984

[54] METHOD AND MEANS FOR DIRECT-CURRENT POLARITY RESTORATION IN MAGNETIC RECORDING

[75] Inventors: Robert M. Batey; Peter J. Petroski, both of Eagle, Id.

[73] Assignee: Hewlett Packard Company, Palo Alto, Calif.

[21] Appl. No.: 365,661

[22] Filed: Apr. 5, 1982

[51] Int. Cl.³ .............................................. G11B 5/09
[52] U.S. Cl. ..................................................... 360/46
[58] Field of Search ........................ 360/46, 45, 39, 40

[56] References Cited

U.S. PATENT DOCUMENTS 4,346,411  8/1982  Buhler et al. ........................ 360/46
4,371,900  2/1983  Huber .................................... 360/46

Primary Examiner—Vincent P. Canney

Attorney, Agent, or Firm—F. David LaRiviere

[57] ABSTRACT

A method and means is disclosed for restoring the direct-current component of a signal read from a storage medium in the form of isolated analog signals which are simultaneously applied to a differentiator and a binary signal generator. The positive pulses of the analog signals trigger the binary signal generator that produces binary signals which initiate and terminate offset signals provided by an offset signal generator. An offset signal is summed differentially with the differentiated analog signal, providing a reconstructed signal which is applied to a zero-crossing detector which produces an output that is either a logical high or low, and that is capable of being processed by digital techniques. The positive-going transitions in the binary signal are equivalent to level transitions of an originally recorded signal.

2 Claims, 4 Drawing Figures

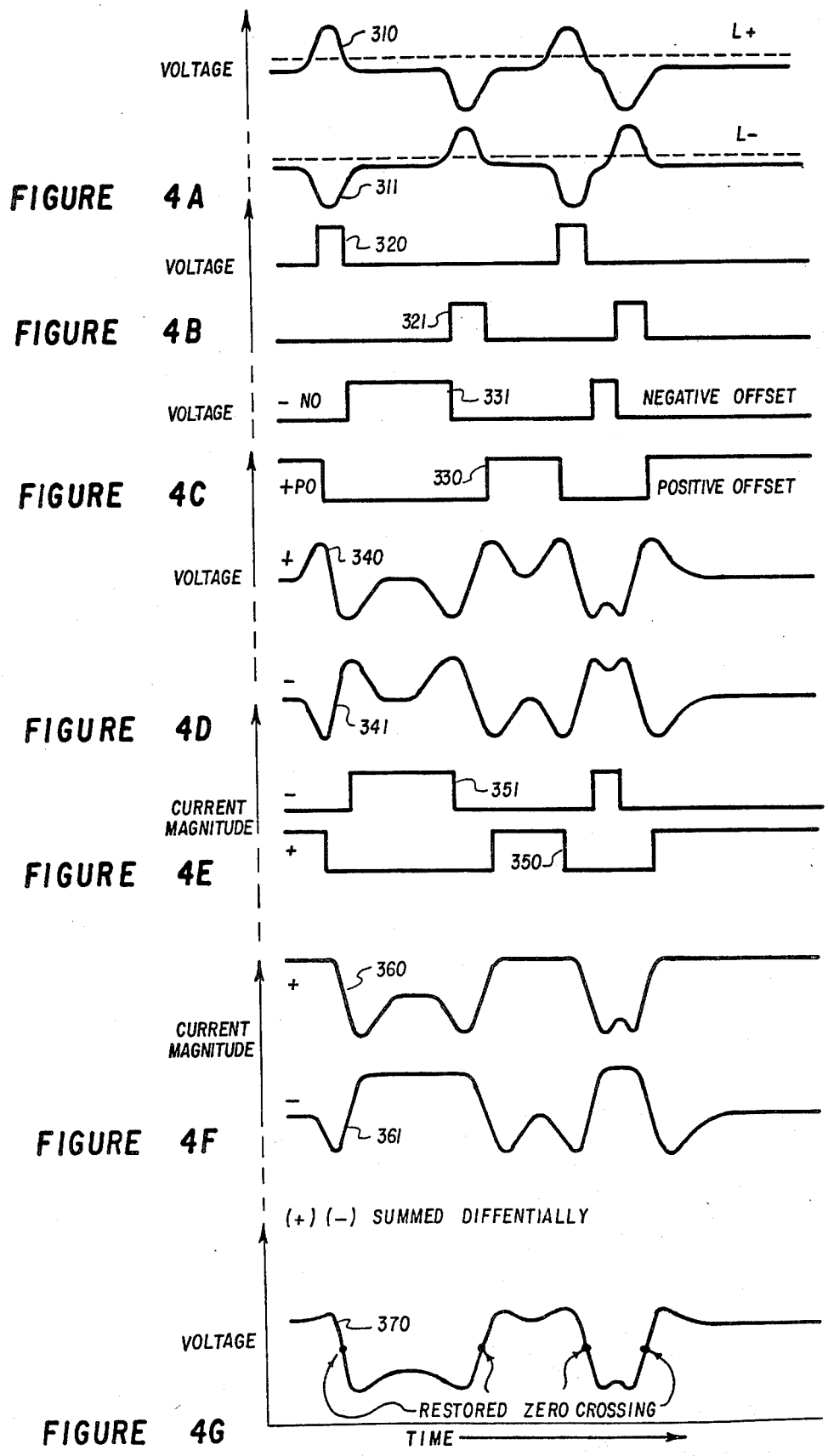

METHOD AND MEANS FOR DIRECT-CURRENT POLARITY RESTORATION IN MAGNETIC RECORDING

BACKGROUND OF THE INVENTION

When information is written onto a magnetic disc, the information is recorded in digital form. Digital squarewaves have vertical edges that a magnetic head can sense. Positive and negative transitions in the square wave, that is the edges, are recognized and recorded on the magnetic medium of the disc. When the magnetic head is used to read the data stored on the disc, the output is not in digital form because of the characteristics of the head and the magnetic medium.

It is frequently desirable to recreate the original digital signal initially written onto the magnetic disc. Therefore, the information read from the disc must be operated upon to approximate the original digital signal written onto the disc. The signal read from the disc may include analog signals with flat regions between peaks. If the locations where the analog signal crosses the zero reference line can be determined, the outline of the original digital signal can be approximated.

In reconstructing the digital signal, a zero-crossing detection device may be used to indicate when an applied signal crossed the base line. By this method, the signal transition edges could be detected and the original signal approximated. However, a flat region of the applied signal adjacent to the base line between peaks created an indeterminant output from the zero-crossing detector. This flattening of the applied signal along the base line is called "shouldering".

Prior solutions to this shouldering phenomena included terminating the detection of zero crossings by binary gating during the periods when the flat regions occured between the peaks of the applied signals. A binary signal was used to operate the binary gate and if the binary signal was in error, the operation of the gate was also in error causing single bit errors in the detector output. In addition, the binary gating generator typically had a long time delay associated with its electronics. Other electronic circuits within the equipment then required a matching time delay so that the desired output could be derived in timed sequence with the delayed binary signal.

SUMMARY OF THE INVENTION

In accordance with the present invention, a digital signal is reconstructed to its prerecorded condition and the direct-current component of the signal which is lost during recording is replaced. Polarity restoration entails shifting the shouldering region off of the zero-axis or base line and restoring the zero-crossover points of the directcurrent component of a signal read from a storage medium without the problems of time delay matching and single bit errors caused by binary gating.

In accordance with the illustrated embodiment, a transducer detects data recorded on a storage medium and produces isolated positive and negative analog signals which are converted to positive and negative binary signals by appropriate circuitry. These binary signals trigger an offset signal generator which provides either a positive or a negative offset signal depending upon the direction of the rate of change of the analog signal. The analog signals are also differentiated to form positive and negative differentiated analog signals which are summed with either the positive or the negative offset signal, respectively, to form a composite signal. Then the composite signal is differentially summed with the derivative of the analog signal of the opposite polarity to form a reconstructed signal which is applied to a zero-crossing detector. The detector produces a logical high-or-low-level signal which forms a binary pulse squarewave representative of the original data pattern.

DESCRIPTION OF THE DRAWINGS

FIG. 4 is a graph which illustrates signal waveforms in accordance with the operation of the system shown in FIG. 1.

DESCRIPTION OF THE PREFERRED EMBODIMENT

Figure 1:
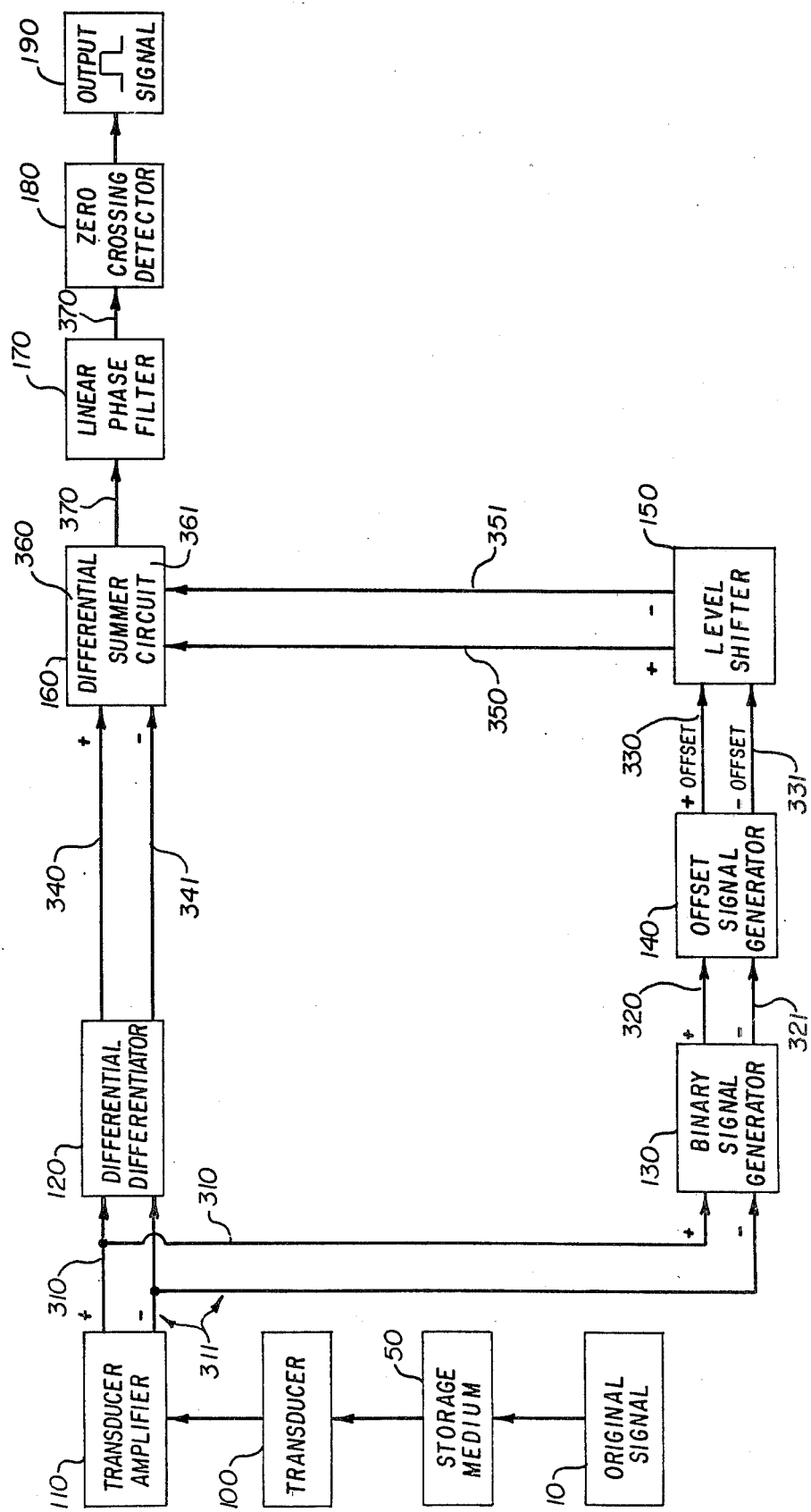
FIG. 1 is a block diagram of the direct-current polarity restoration system in accordance with the preferred embodiment.

FIG. 1 is a block diagram of the elements of the direct-current polarity restoration system. The original signal 10 recorded in a storage medium 50 is detected by transducer 100 and is provided by a transducer-amplifier 110 in the form of isolated positive and negative analog signals 310, 311, as shown in FIG. 4(A). Signals 310 and 311 are introduced into the direct-current polarity restoration system via the differential amplifier 120 and the binary signal generator 130, simultaneously. Generator 130 senses a predetermined signal level and changes from one binary state to the other binary state when signal 310 or 311 crosses that level, thus converting signals 310, 311 to binary signals 320, 321, as shown in FIG. 4(B). Then signals 320, 321 are applied to an offset signal generator 140 which combats the problem of "shouldering" by providing either offset signal 330 or 331, as shown in FIG. 4(C), to increase the level of the flat regions adjacent to the zero-axis to well above or below the zero axis so that a zero-crossing detector 180 can distinguish a zero-axis crossing of signals 181 and 182. Whether signal 330 or 331 is produced depends upon the slope of the analog signals 310, 311 at any particular instant. Thus, the essence of polarity restoration is the summation of signals 330, 331 to signals 310, 311 at the appropriate time to eliminate the ambiguous shouldering regions adjacent to the zero axis. Now, signals 330, 331 are applied to level shifter 150 which converts signals 330, 331 from a voltage signal to a current signal with its amplitude shifted in proportion to the shift made by generator 140. This results in level-shifted offset signals 350, 351, as shown in FIG. 4(E), that are next applied to the differential summer circuit 160.

Recall that signals 310 and 311 are also applied to differentiator 120 which produces analog current signals 340 and 341, as shown in FIG. 4(D), that are derived from the applied voltage signals. Then signals 340 and 350 or signals 341 and 351 are summed continuously within differential summer circuit 160 to form a composite signal 360 or 361, as shown in FIG. 4(F). Then signal 360 or 361 is differentially summed with the opposite polarity signal, either 340 or 341, resulting in reconstructed signal 370, as shown in FIG. 4(G), which is reconverted into a voltage and then applied to linear phase filter 170. The output of filter 170 is applied to a zero-crossing detector circuit 180 which indicates the transitions in signal 370 and provides a binary output signal 190 which can be processed by digital techniques. A positive-going transition of signal 190 is equivalent to a transition of the original signal 10 recorded onto storage medium 50.

Figure 2:
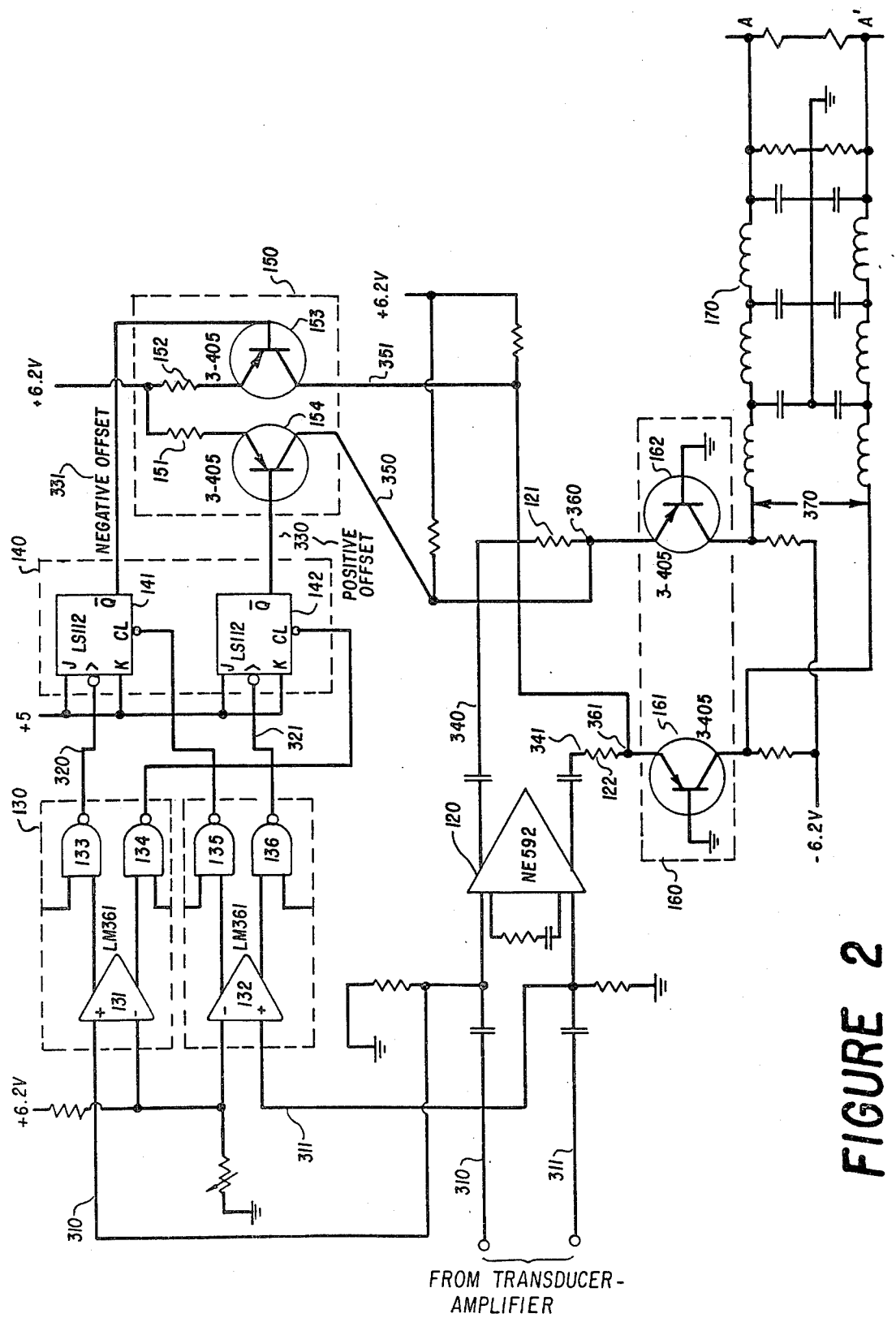
FIG. 2 is a circuit diagram of the direct-current polarity restoration system illustrating the differentiator and the peak qualification circuitry utilized in the preferred embodiment.

Referring now to FIG. 2, there is shown a detailed circuit diagram of the direct-current polarity restoration system. As transducer 100 senses the transitions in the storage medium 50, it converts the data into signals 310 and 311 which are amplified by amplifier 110. Signals 310 and 311 are applied to to generator 130 which converts the signals 310, 311 to binary signals 320, 321 by sensing a predetermined nonzero level of signal amplitude and, when signals 310 and 311 cross this level, amplifiers 131 and 132 conduct and trigger logic gates 133, 134, 135, and 136 which changes the output signal level. If signals 310 or 311 have a positive slope, generator 130 toggles from a logical low to a logical high, and if signals 310 or 311 have a negative slope, generator 130 toggles from a logical high to a logical low. Next, signals 320 and 321 are applied to generator 140 which supplies an offset signal, either 330 or 331, to increase the signal level within the shouldering regions of signals 310 and 311 to permit detector 180 to identify a zero-axis crossing. The two signals 320 and 321 produced by generator 130 can be used to initiate and terminate the signals 330 and 331. Thus, signal 330 is generated from signal 321 within the flat shouldering region after signal 321 but before signal 320 and signal 331 is generated from signal 320 in the flat shouldering region after signal 320 but before signal 321. Therefore, signal 330 increases the level above the zero axis of signals 310 and 311 having a positive slope within the shouldering region and signal 331 increases the level below the zero axis of signals 310 and 311 having a negative slope within the shouldering region. Since neither signal 310 nor 311 can be positive and negative simultaneously, then only one offset signal 330 or 331 can be generated at any instant but both signals 330 and 331 are necessary to preserve the zero crossings. The signals 330 and 331 are applied to level-shifter circuit 150 which converts signals 330 and 331 from a voltage to a current as a result of a potential difference across resistors 151 and 152. Also, transistors 153 and 154 shift the level of signals 330 and 331 by a factor proportional to and controlled by the shift created by generator 140 forming signals 350 and 351 which are applied to summer circuit 160.

Figure 3:
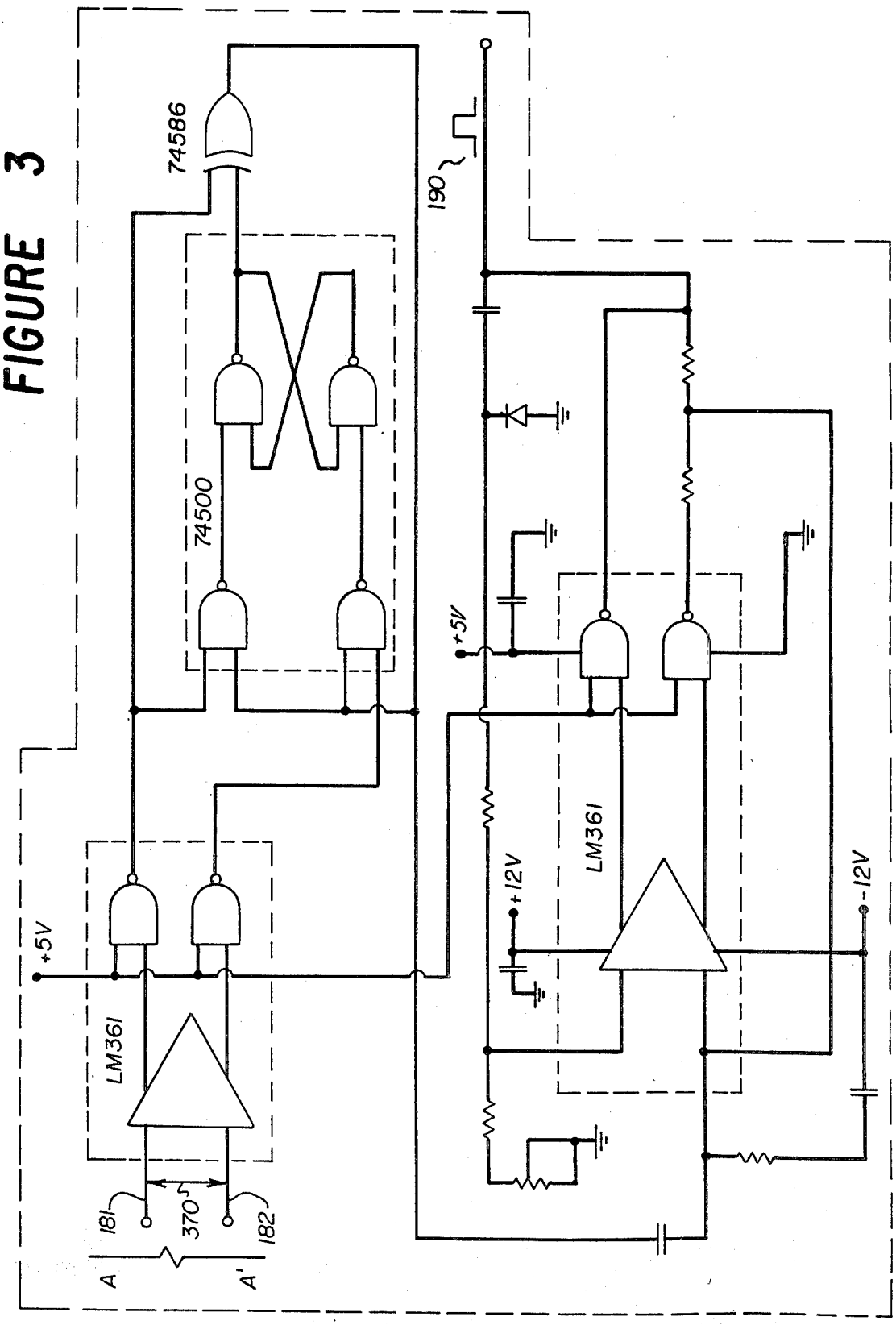
FIG. 3 is a circuit diagram of the direct-current polarity restoration system illustrating the zero-crossing detection circuitry utilized in the preferred embodiment.

Recall that signals 310 and 311 are also applied to differentiator 120 which produces signal 340 which is positive relative to ground reference and signal 341 which is negative relative to ground reference. Then, signals 340 and 341, which are voltage signals, are converted to current signals resulting from the potential difference across resistors 121 and 122. The three current signals, namely; those generated by 340, 341, and 350 or 351 are simultaneously applied to circuit 160. When signal 350 is available, it is summed with signal 340 to provide composite signal 360 which is then summed differentially with signal 341 to provide reconstructed signal 370. When signal 351 is available, it is summed with signal 341 to provide composite signal 361 which is then summed differentially with signal 340 to provide reconstructed signal 370. Therefore, whether signal 350 or 351 is available, only one reconstructed signal 370 is produced by circuit 160 which is then applied to filter 170 to eliminate distortion and noise before signal 370 is applied to detector 180. Note that detector 180 includes a differential comparator that receives two signals, 181 and 182 from filter 170, as shown in FIGS. 2 and 3. If these signals were summed, they would form signal 370. Instead, these signals are differentially compared to form signal 190. When signal 181 is changing polarity with respect to signal 182, dectector 180 provides a pulse signal 190 greater than zero. The binary signal at the output of detector 180 is a positive pulse level with every transition of signal 181 or 182 forming a logical high and every nontransition forming a logical low.

Therefore, the present invention restores the direct current component of a signal read from a magnetic storage medium.

We claim:

1. An apparatus for restoring the direct-current component of a signal read from a storage medium, said apparatus comprising:

first means responsive to a transducer signal for providing first and second signal states having first and second polarity levels, respectively, said first and second signal states having leading and trailing transition portions;

second means coupled to the output of said first means for providing first and second binary signals in response to said first and said second signal states, respectively;

third means coupled to the output of said second means and responsive to said first and second binary signals for providing a first positive and a first negative offset signal, said first positive offset signal commencing on the trailing edge of said second binary signal and terminating on the leading edge of said first binary signal, said first negative offset signal commencing on the trailing edge of said first binary signal and terminating on the leading edge of said second binary signal;

fourth means coupled to the output of said third means for converting said first positive and first negative offset signal to a second positive and a second negative offset signal, respectively, and for shifting the output level of said second positive and said second negative offset signals to predetermined levels;

differentiating means coupled to receive each of said first and second signal states from said first means for providing a derivative, said derivative equal to the difference between the first derivative of each of said signal states;

summing means coupled to the outputs of said fourth means and said differentiating means for adding said level-shifted second positive offset signal to the derivative of said first signal state and said level-shifted second negative offset signal to the derivative of said second signal state, respectively, to produce first and second composite signals, said first and second composite signals summed differentially to provide a reconstructed signal;

detector means coupled to the output of said summing means for providing a signal output in response to a zero crossing of said reconstructed signal.

2. A method for restoring the direct-current component of a signal read from a storage medium, said method comprising the steps of:

providing first and second signal states in response to data recorded in a storage medium having first and second polarity levels, respectively, said first and second signal states having leading and trailing transition portions;

providing first and second binary signals in response to said first and said second signal states, respectively;

providing a first positive and a first negative offset signal responsive to said first and second binary signals, said first positive offset signal commencing on the trailing edge of said second binary signal and terminating on the leading edge of said first binary signal, said first negative offset signal commencing on the trailing edge of said first binary signal and terminating on the leading edge of said second binary signal;

converting said first positive and said first negative offset signal to a second positive and a second negative offset signal, respectively, and for shifting the output level of said second positive and said second negative offset signals in response to predetermined levels;

differentiating said first and said second signal states providing a positive and a negative differential derivative, in response to the positive and negative difference between the first derivative of each of said signal states, respectively;

providing a first and second composite signal in response to summing said level-shifted positive offset signal to the derivative of said first signal state and said level-shifted second negative offset signal to the derivative of said second signal state, respectively, said first and second composite signals summed differentially to provide a reconstructed signal;

detecting a zero crossing of said reconstructed signal and providing a signal output in response thereto.

* * * * *